(12) United States Patent
Kang et al.

(10) Patent No.: US 9,876,883 B2
(45) Date of Patent: Jan. 23, 2018

(54) ELECTRONIC DEVICE AND METHOD FOR MANUFACTURING OUTER HOUSING THEREOF

(71) Applicant: Samsung Electronics Co., Ltd., Gyeonggi-do (KR)

(72) Inventors: Yi Tae Kang, Gyeonggi-do (KR); Jae Woo Lee, Seoul (KR); Byoung Soo Lee, Gyeonggi-do (KR); Kwang Soo Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/292,920

(22) Filed: Oct. 13, 2016

(65) Prior Publication Data

US 2017/0104856 A1    Apr. 13, 2017

(30) Foreign Application Priority Data

Oct. 13, 2015 (KR) ........................ 10-2015-0142918

(51) Int. Cl.
| | |
|---|---|
| *H04M 1/00* | (2006.01) |
| *H04M 1/02* | (2006.01) |
| *G06F 1/16* | (2006.01) |
| *H04B 1/3888* | (2015.01) |

(52) U.S. Cl.
CPC ........ *H04M 1/0249* (2013.01); *G06F 1/1626* (2013.01); *G06F 1/1637* (2013.01); *G06F 1/1698* (2013.01); *H04B 1/3888* (2013.01); *H04M 1/0266* (2013.01); *G06F 2200/1633* (2013.01); *H04M 1/0216* (2013.01); *H04M 2201/38* (2013.01)

(58) Field of Classification Search
None
See application file for complete search history.

(56) References Cited

U.S. PATENT DOCUMENTS

| | | | | |
|---|---|---|---|---|
| 8,024,016 B2 * | 9/2011 | Lim | .................... | H04M 1/0283 455/575.4 |
| 8,328,008 B2 * | 12/2012 | Diebel | ................... | A45C 11/00 206/305 |
| 8,344,836 B2 * | 1/2013 | Lauder | ..................... | H01F 7/04 206/320 |
| 8,665,044 B2 * | 3/2014 | Lauder | ................. | G06F 1/1626 206/320 |

(Continued)

FOREIGN PATENT DOCUMENTS

| | | |
|---|---|---|
| KR | 100384596 | 8/2003 |
| KR | 1020150017078 | 2/2015 |

*Primary Examiner* — Tuan A Tran
(74) *Attorney, Agent, or Firm* — The Farrell Law Firm, P.C.

(57) ABSTRACT

An electronic device is provided which includes an outer housing that surrounds at least a portion of the electronic device, and a display, a front surface of which is exposed to the outside through one surface of the outer housing, and the outer housing includes a metal layer arranged on a rear surface of the display and includes at least one opening, a first non-metal layer arranged on an upper surface of the metal layer to overlap the entire metal layer while filling at least a portion of the at least one opening, and a second non-metal layer arranged on an upper surface of the first non-metal layer to be exposed to the outside.

20 Claims, 8 Drawing Sheets

(56) References Cited

U.S. PATENT DOCUMENTS

| | | | |
|---|---|---|---|
| 8,988,876 B2* | 3/2015 | Corbin | A45C 13/002 361/679.58 |
| 9,335,793 B2 | 5/2016 | Rothkopf | |
| 9,754,463 B2* | 9/2017 | Sartee | G08B 5/36 |
| 2008/0302456 A1* | 12/2008 | Cook | A45C 11/00 150/154 |
| 2012/0194448 A1 | 8/2012 | Rothkopf | |
| 2012/0268891 A1* | 10/2012 | Cencioni | G06F 1/1626 361/679.55 |
| 2012/0300383 A1* | 11/2012 | Lauder | G06F 1/1647 361/679.26 |
| 2013/0162554 A1* | 6/2013 | Lauder | H01F 7/04 345/173 |
| 2013/0300679 A1* | 11/2013 | Oh | A45C 11/00 345/173 |
| 2014/0049911 A1 | 2/2014 | Corbin et al. | |
| 2014/0243053 A1* | 8/2014 | Hynecek | A45C 11/00 455/575.8 |
| 2015/0153783 A1 | 6/2015 | Corbin et al. | |
| 2016/0224238 A1 | 8/2016 | Rothkopf | |

\* cited by examiner

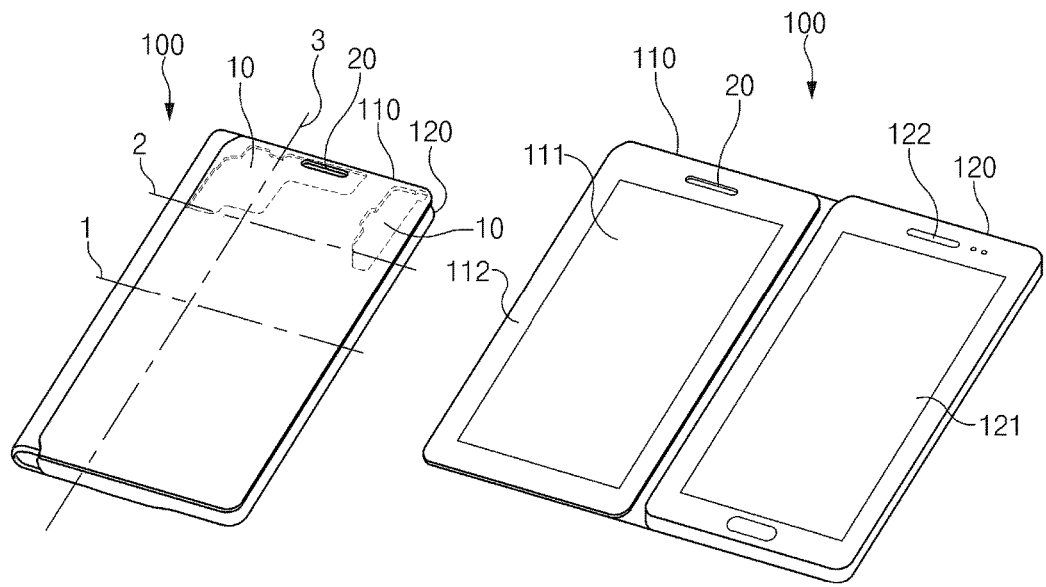
FIG. 1A    FIG. 1B
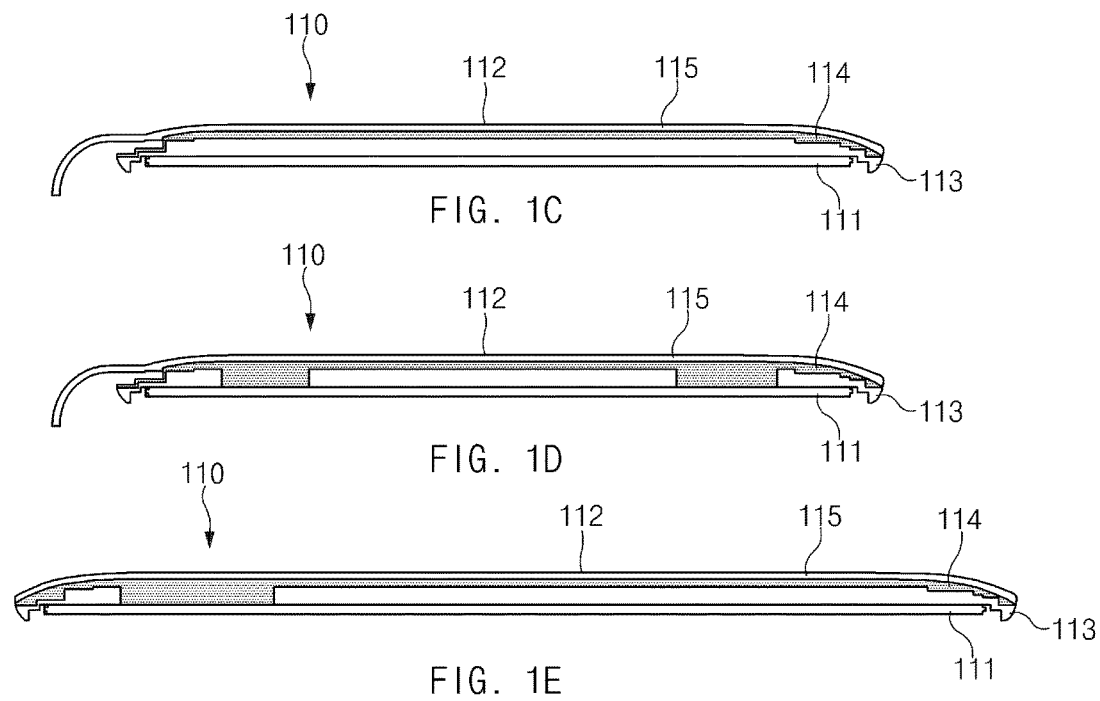
FIG. 1C
FIG. 1D
FIG. 1E

ELECTRONIC DEVICE AND METHOD FOR MANUFACTURING OUTER HOUSING THEREOF

PRIORITY

This application claims priority under 35 U.S.C. §119(a) to Korean Patent Application Serial No. 10-2015-0142918 which was filed on Oct. 13, 2015 in the Korean Intellectual Property Office, the entire disclosure of which is incorporated herein by reference.

BACKGROUND

1. Field of the Disclosure

The present disclosure generally relates to an electronic device, and more particularly, to an electronic device including an outer housing and a method for manufacturing the outer housing.

2. Description of the Related Art

Various types of electronic products have been developed and distributed due to the development of new electronic technologies. In particular, portable electronic devices, such as smartphones and tablet PCs, which have various functions have been increasingly distributed.

However, the portable electronic devices may be damaged by an external impact due to their mobile characteristics. In particular, as the displays are vulnerable to an external impact, methods for effectively protecting the displays have been developed.

Metals having high strength may be used to protect the displays, but the metals influence the performance of antennas due to their electrical characteristics and it may be difficult to attach a material such as leather or cloth to the metal case.

SUMMARY

Aspects of the present disclosure address at least the above-mentioned problems and/or disadvantages and provide an electronic device that may be secure and strong while minimizing the influence on an antenna. The electronic device of the present disclosure may employ a material that is not easily attached to metal, and the present disclosure also provides a method for manufacturing an outer housing of the electronic device.

In accordance with an aspect of the present disclosure, an electronic device is provided including an outer housing that surrounds at least a portion of the electronic device, and a display on a front surface which is exposed to the outside through one surface of the outer housing, wherein the outer housing includes a metal layer that is arranged on a rear surface of the display and includes at least one opening, a first non-metal layer that is arranged on an upper surface of the metal layer to overlap the entire metal layer while filling at least a portion of the at least one opening, and a second non-metal layer that is arranged on an upper surface of the first non-metal layer to be exposed to the outside.

In accordance with another aspect of the present disclosure, a method of manufacturing an outer housing of an electronic device is provided, the method including forming at least one opening in a first area of a metal plate, forming at least one opening in a second area of the metal plate, forming a first non-metal layer in at least a portion of the at least one opening formed in the second area and on an upper surface of the metal plate such that the first non-metal layer overlaps the entire second area of the metal plate, cutting the first non-metal layer such that the first non-metal layer has a specific thickness, cutting an area corresponding to the first area, and attaching a second non-metal material on an upper surface of the first non-metal layer.

In accordance with another aspect of the present disclosure, an electronic device including an outer housing is provided that includes a first surface facing a first direction and a second surface facing a second direction opposite to the first direction, and a display exposed through a first surface of the outer housing, wherein the outer housing includes a plate that forms at least a portion of the second surface, and wherein the plate includes a metallic substrate that includes at least one opening, a first non-metal layer that overlaps at least a portion of the metallic substrate when viewed from the top of the plate and is exposed to the second surface, a second non-metal layer that includes a first portion that fills at least a portion of the at least one opening and is arranged between the first non-metal layer and the second surface and a second portion that is arranged between the first non-metal layer and the metallic substrate while substantially overlapping the entire metal substrate when viewed from the top of the plate, and a bonding layer that is arranged between the first non-metal layer and the second non-metal layer.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 1A to 1E are views illustrating a structure of an electronic device according to an embodiment of the present disclosure;

DETAILED DESCRIPTION

Figure 2:
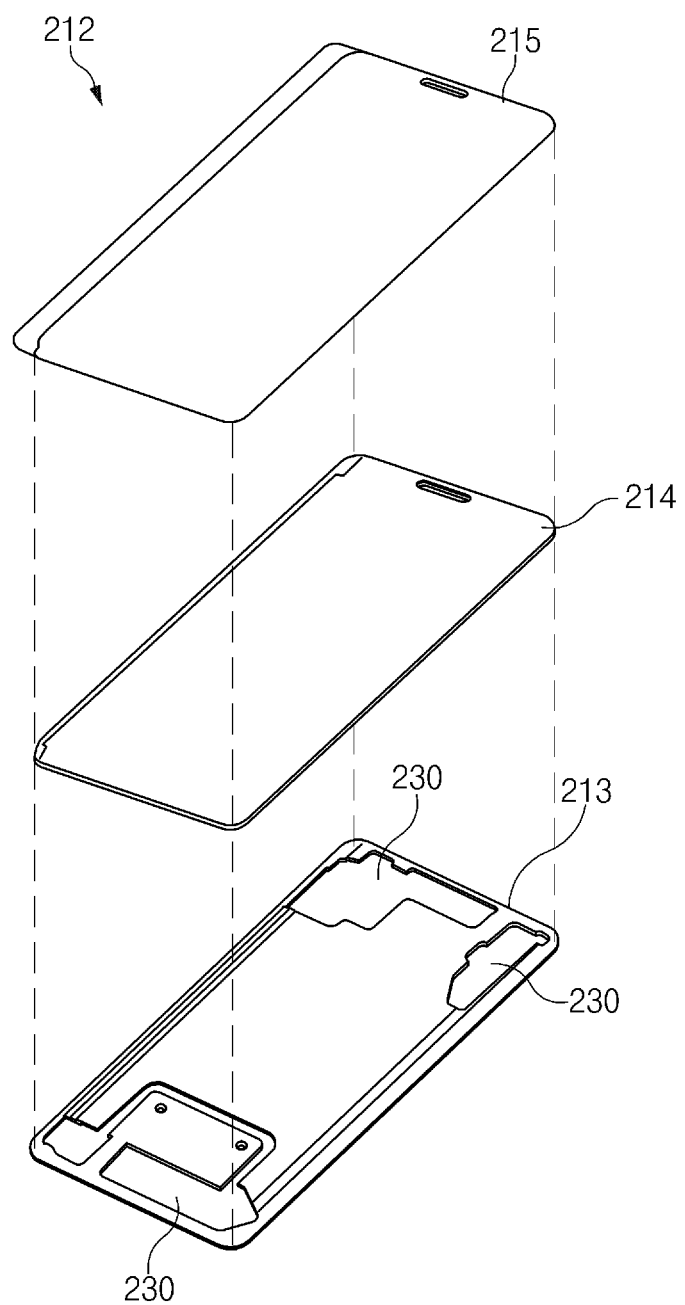
FIG. 2 is a view illustrating a structure of an outer housing according to an embodiment of the present disclosure.

An embodiment of the present disclosure may be described with reference to the accompanying drawings. Accordingly, those of ordinary skill in the art will recognize that modifications, equivalents, and/or alternatives to the embodiments described herein may be made without departing from the scope and spirit of the present disclosure. With regard to the description of the drawings, similar elements may be marked by similar reference numerals.

In the present disclosure, the expressions "have", "may have", "include" and "comprise", or "may include" and "may comprise" as used herein may indicate the existence of corresponding features (e.g., elements such as numeric values, functions, operations, or components) but do not exclude the presence of additional features.

In the present disclosure, the expressions "A or B", "at least one of A or/and B", or "one or more of A or/and B", and the like used herein may include any and all combinations of one or more of the associated listed items. For example, the terms "A or B", "at least one of A and B", or "at least one of A or B" may refer to all of the case (1) where at least one A is included, the case (2) where at least one B is included, or the case (3) where both of at least one A and at least one B are included.

The terms "first", "second", and the like as used herein may refer to various elements of an embodiment of the present disclosure, but do not limit the elements. For example, "a first user device" and "a second user device" may indicate different user devices regardless of the order or priority thereof. For example, without departing the scope of the present disclosure, a first element may be referred to as a second element, and similarly, a second element may be referred to as a first element.

It is understood that when an element (e.g., a first element) is referred to as being "operatively or communicatively coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening elements (e.g., a third element).

According to the situation, the expression "configured to" as used herein may be used interchangeably with, for example, the expressions "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a general-purpose processor (e.g., a central processing unit (CPU) or an application processor) which performs corresponding operations by executing one or more software programs which are stored in a memory device.

Terms used in the present disclosure are used to describe embodiments and do not limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein. In some cases, even if terms are defined in the specification, they may not be interpreted to exclude embodiments of the present disclosure.

FIGS. 1A to 1E are views illustrating a structure of an electronic device according to an embodiment of the present disclosure.

Referring to FIGS. 1A and 1B, the electronic device 100 includes a cover 110 (or a first part) and a body 120 (or a second part). FIG. 1A illustrates a structure of the electronic device 100 in a state in which the cover 110 of the electronic device 100 is closed, and FIG. 1B illustrates the structure of the electronic device 100 in a state in which the cover 110 of the electronic device 100 is open.

The electronic device 100 according to an embodiment of the present disclosure may include an outer housing that surrounds an outer side of the electronic device 100. The outer housing may include a metal layer, a first non-mental layer, and a second non-metal layer. The metal layer may include an opening for securing performance of an antenna or inserting another element (for example, a speaker or a light emitting module). For example, referring to FIG. 1A, the metal layer of the outer housing may include at least one opening 10. The first non-metal layer may be formed on the metal layer while filling at least a portion of the opening formed in the metal layer in an injection-molding method. The second non-metal layer may be attached to the first non-metal layer. Because the second non-metal layer is attached to the first non-metal layer, an attachment force of the second non-metal layer may increase. The cover 110 and the body 120 may be connected to each other by the external housing. For example, the cover 110 and the body 120 may be connected to each other by the second non-metal layer of the external housing.

Referring to FIG. 1B, the electronic device 100 includes a plurality of displays 111 and 121. According to an embodiment, each of the cover 110 and the body 120 may include at least one display. For example, the cover 110 includes a first display 111, and the body 120 includes a second display 121.

The cover 110 and the body 111 includes a display 111 and an outer housing 112. A front surface of the display 111 may be exposed to the outside through one surface of the outer housing 112. For example, in a state in which the cover 110 is closed, the display 111 may be exposed to the outside through an inner surface (that is, a surface that faces the body 120) of the outer housing 112.

The outer housing 112 may surround at least a portion of the electronic device 100. The outer housing 112 may surround a periphery of the first display 111 to protect the first display 111 from an impact and the like.

According to an embodiment of the present disclosure, referring to FIGS. 1A and 1B, the cover 110 includes an opening 20 that passes through the cover 110 (for example, the outer housing). For example, the cover 110 may include an opening that passes through the metal layer, the first non-metal layer, and the second non-metal layer of the outer housing. The opening 20 that passes through the cover 110 may be formed in an area corresponding to a speaker 122 included in the body 120 in a state in which the cover 110 is closed, such that a sound that is output from the speaker 122 included in the body 120 is not interrupted by the cover 110. The opening 20 that passes through the cover 110 may be omitted.

According to an embodiment of the present disclosure, FIG. 1C illustrates a cutaway surface of the cover 110 that is cut away by a first cutting line 1 that crosses the cover 110 transversely in a state in which the cover 110 is closed. Referring to FIG. 1C, the cover 110 includes an outer housing 112 and/or a display (for example, a first display 111). The outer housing 112 includes a metal layer 113, a first non-metal layer 114, and a second non-metal layer 115.

The metal layer 113 may be arranged on an upper surface (or a rear surface) of the display 111 in a state in which the cover 110 is closed. The metal layer 113 may include at least one opening. The at least one opening passes through a metal plate and an outer area of the metal plate may be cut away after a first non-metal layer is formed on the metal plate to manufacture the metal layer 113 having a specific shape. The metal layer 113 may surround a periphery of the display 111 to protect the display 111.

The first non-metal layer 114 may be arranged to overlap the entire metal layer 113 on an upper surface of the metal layer 113. For example, the first non-metal layer 114 may be arranged to overlap the entire metal layer 113 such that the metal layer 113 is not visible from the top. The first non-metal layer that fills at least a portion of the opening formed in the metal layer may be formed by injection-molding (for example, insert injection-molding) a first non-metal material of a specific thickness on an upper surface of the metal layer 113. The first non-metal layer 114 formed on the metal layer may be cut such that a thickness of the first non-metal layer 114 is a specific thickness (for example, 0.1 mm) or less.

The first non-metal layer 114 may be formed of a polymeric material (or a resin). For example, the first non-metal layer 114 may include a polymeric material such as polycarbonate (PC) or polybutylene terephthalate (PBT). The first non-metal layer 114 may further include a glass fiber in addition to a polymer.

The second non-metal layer 115 according to an embodiment of the present disclosure may be arranged on an upper surface of the first non-metal layer 114 to be exposed to the outside. A bonding layer may be formed on the first non-metal layer 114 that is cut to have a specific thickness and the second non-metal layer 115 may be attached to the bonding layer. The second non-metal layer 115 may be formed of leather or cloth. The second non-metal layer 115 may be formed of high-hardness plastic or glass. When the second non-metal layer 115 is formed of glass, a printing layer, in which a graphic image having a color, a pattern, or a shape, may be arranged between the first non-metal layer 114 and the second non-metal layer 115. The graphic image printed in the printing layer, for example, may visibly pass through the second non-metal layer 115 formed of glass and may be viewed by the user.

The first non-metal layer 114 and the second non-metal layer 115 may be formed of different material.

According to an embodiment of the present disclosure, FIG. 1D illustrates a cutaway surface of the cover 110 that is cut away by a second cutting line 2 that crosses the cover 110 transversely in a state in which the cover 110 is closed. In particular, FIG. 1D illustrates a cutaway surface that crosses an opening included in the metal layer 10. Referring to FIG. 1D, the cover 110 includes an outer housing 112 and/or a display (for example, a first display 111). The outer housing 112 includes a metal layer 113, a first non-metal layer 114, and a second non-metal layer 115.

The metal layer 113 according to an embodiment of the present disclosure may be arranged on an upper surface (or a rear surface) of the display 111 in a state in which the cover 110 is closed. The metal layer 113 may include at least one opening.

The first non-metal layer 114 according to an embodiment of the present disclosure may be arranged to overlap the entire metal layer 113 on an upper surface of the metal layer 113 while filling at least a portion of at least one opening formed in the metal layer 113. For example, the first non-metal layer 114 may be arranged to overlap the entire metal layer 113 such that the metal layer 113 is not visible from the top. The first non-metal layer 114 may be formed of a polymeric material (or a resin). For example, the first non-metal layer 114 may include a polymeric material such as PC or PBT. The first non-metal layer 114 may further include a glass fiber in addition to a polymer.

The second non-metal layer 30 according to an embodiment of the present disclosure may be arranged on an upper surface of the first non-metal layer 114 to be exposed to the outside. The second non-metal layer 30 may be formed of leather or cloth.

According to an embodiment of the present disclosure, FIG. 1E illustrates a cutaway surface of the cover 110 that is cut away by a third cutting line 3 that crosses the cover 110 vertically in a state in which the cover 110 is closed. Referring to FIG. 1E, the cover 110 includes an outer housing 112 and a display (for example, a first display 111). The outer housing 112 includes a metal layer 113, a first non-metal layer 114, and a second non-metal layer 30.

The metal layer 113 according to an embodiment of the present disclosure may be arranged on an upper surface (or a rear surface) of the display 111 in a state in which the cover 110 is closed. The metal layer 113 may include at least one opening.

The first non-metal layer 114 according to an embodiment of the present disclosure may be arranged to overlap the entire metal layer 113 on an upper surface of the metal layer 113 while filling at least a portion of at least one opening formed in the metal layer 113. That is, the first non-metal layer 114 may be arranged to overlap the entire metal layer 113 such that the metal layer 113 is not visible from the top. The first non-metal layer 114 may be formed of a polymeric material (or a resin). For example, the first non-metal layer 114 may include a polymeric material such as PC or PBT. The first non-metal layer 114 may further include a glass fiber in addition to a polymer.

The second non-metal layer 115 according to an embodiment of the present disclosure may be arranged on an upper surface of the first non-metal layer 114 to be exposed to the outside. The second non-metal layer 115 may be formed of leather or cloth.

The outer housing 112 may further include a bonding layer that is arranged between the first non-metal layer 114 and the second non-metal layer 115 to bond the first non-metal layer 114 and the second non-metal layer 115. That is, the bonding layer may function to bond the second non-metal layer 115 to the first non-metal layer 114.

Although it has been described in the embodiment described with reference to FIG. 1 that the outer housing 112 is applied to a flip type cover 110, the outer housing 112 may be applied to the body of an electronic device 100 when the electronic device 100 is of a folding or bar type electronic device that does not include the cover 110.

FIG. 2 is a view illustrating a structure of an outer housing according to an embodiment of the present disclosure.

Referring to FIG. 2, the outer housing 212 (for example, the outer housing 112 of FIG. 1) includes a metal layer 213 (for example, the metal layer 113 of FIG. 1), a first non-metal layer 214 (for example, the first non-metal layer 114 of FIG. 1), and a second non-metal layer 215 (for example, the second non-metal layer 115 of FIG. 1).

The metal layer 213 according to an embodiment of the present disclosure may include at least one opening 230. The metal layer 213 may include at least one opening 230 in an area corresponding to an antenna included in a body (for example, the body 120 of FIG. 1). For example, the metal layer 213 may include an opening in an area that overlaps an antenna in a state in which the cover (for example, the cover 110 of FIG. 1) is closed. For example, the metal layer 213 may include an opening in an area that overlaps an antenna in a state in which the cover 110 is opened to face a rear surface of the body. Accordingly, the performance of the antenna may be prevented from deteriorating due to metal of the body. The outer housing 212 may include an antenna (or an antenna radiator), and the metal layer 213 may include at least one opening in an area corresponding to the antenna arranged within the outer housing 212. For example, the at least one opening may be arranged adjacent to the antenna. The outer housing 212 may include a speaker, and the metal layer 213 may include at least one opening in an area corresponding to the speaker arranged within the outer housing 212.

The first non-metal layer 214 may be arranged to overlap the entire metal layer 213 on an upper surface of the metal layer 213 while filling at least a portion of at least one opening formed in the metal layer 213. The first non-metal layer 214 may be attached to an upper surface of the metal layer 213 through an injection-molding method. The first non-metal layer 214 may be cut to have a specific thickness after the injection-molding process.

The second non-metal layer 215 may be arranged on an upper surface of the first non-metal layer 214 to be exposed to the outside. The second non-metal layer 215 may be bonded to the first non-metal layer 214 by a bonding layer arranged between the first non-metal layer 214 and the second non-metal layer 215. The second non-metal layer 215 may be formed of leather or cloth.

According to an embodiment of the present disclosure, the second non-metal layer 215 may be attached to the first non-metal layer 214 as the first non-metal layer 214 is arranged to overlap the entire metal layer. For example, when the first non-metal layer 214 overlaps a portion (for example, an area corresponding to an opening formed in the metal layer) of the metal layer 213, a portion of the second non-metal layer 215 may be attached to the metal layer 213 and the remaining portions of the second non-metal layer 215 may be attached to the first non-metal layer 214. Because an attachment force of the second non-metal layer 215 is weak due to the characteristics thereof, the second non-metal layer 215 may not be securely attached to the metal layer 213. When the first non-metal layer 214 overlaps a portion (for example, an area corresponding to an opening formed in the metal layer) of the metal layer 213, the second non-metal layer 215 may be viewed discontinuously due to a spacing or a height difference between the metal layer 213 and the first non-metal layer 214 even though the second non-metal layer 215 is attached to the metal layer 213 and the first non-metal layer 214. According to an embodiment of the present disclosure, an attachment force of the second non-metal layer 215 may be reinforced by arranging the first non-metal layer 214 such that the first non-metal layer 214 overlaps the entire metal layer, and a surface of the outer housing 212 may be viewed as continuously smooth.

Figure 3:
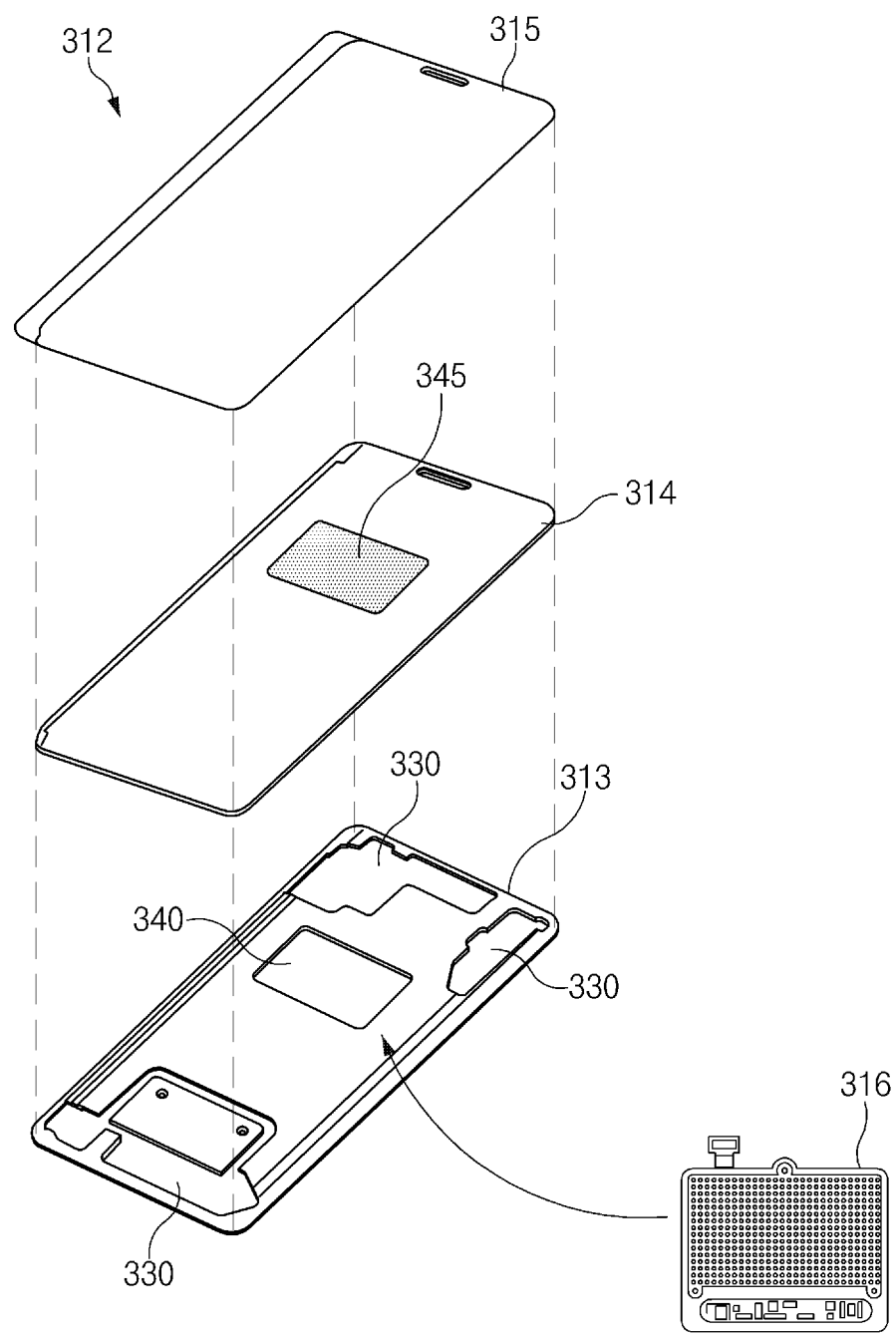
FIG. 3 is a view illustrating a structure of a cover according to an embodiment of the present disclosure.

FIG. 3 is a view illustrating a structure of a cover according to an embodiment of the present disclosure.

Referring to FIG. 3, the outer housing 312 (for example, the outer housing 112 of FIG. 1) includes a metal layer 313 (for example, the metal layer 113 of FIG. 1), a first non-metal layer 314 (for example, the first non-metal layer 114 of FIG. 1), and a second non-metal layer 315 (for example, the second non-metal layer 115 of FIG. 1).

The metal layer 313 according to an embodiment of the present disclosure includes at least one opening 330 and 340. The metal layer 313 may include at least one opening 330 in an area corresponding to an antenna included in a body (for example, the body 120 of FIG. 1). The metal layer 313 may include an opening 340 for inserting a light emitting module 316 in addition to the opening 330 for securing performance of the antenna. For example, the metal layer 313 may include an opening 340 for inserting the light emitting module 316 into a central portion thereof.

A cover (for example, the cover 110 of FIG. 1) may include a light emitting module 316 that is arranged within the outer housing. The light emitting module 316 may include at least one light source. A light source included in the light emitting module 316, for example, may include a light emitting diode (LED), a laser diode (LD), or a solid laser. The light emitting module 316 may be arranged in the at least one opening included in the metal layer, in parallel to the metal layer. The light emitting module 316 may display a letter or an icon by using at least one light source. For example, the light emitting module 316 may control an on/off operation of at least one light source to display a letter or an icon, and may change a location or a form of the displayed letter or icon.

The first non-metal layer 314 according to an embodiment of the present disclosure may be arranged to overlap the entire metal layer 313 on an upper surface of the metal layer 313 while filling at least a portion of at least one opening formed in the metal layer 313. The first non-metal layer 314 may include at least one opening corresponding to at least one light source included in the light emitting module 316. For example, the first non-metal layer 314 may include at least one opening at a location corresponding to at least one light source of the light emitting module 316 in an area 345 corresponding to the light emitting module 316. Light emitted by the at least one light source may pass through the at least one opening formed in the first non-metal layer 314, and will be described in detail with reference to FIG. 4.

The second non-metal layer 315 according to an embodiment of the present disclosure may be arranged on an upper surface of the first non-metal layer 314 to be exposed to the outside. The light emitting by the light emitting module 316 and passing through a plurality of openings formed in the first non-metal layer 314 may pass through the second non-metal layer 315 and may be emitted to the outside.

The bonding layer that bonds the second non-metal layer 315 to the first non-metal layer 314 also may include at least one opening at a location corresponding to the at least one light source of the light emitting module 316.

Figure 4:
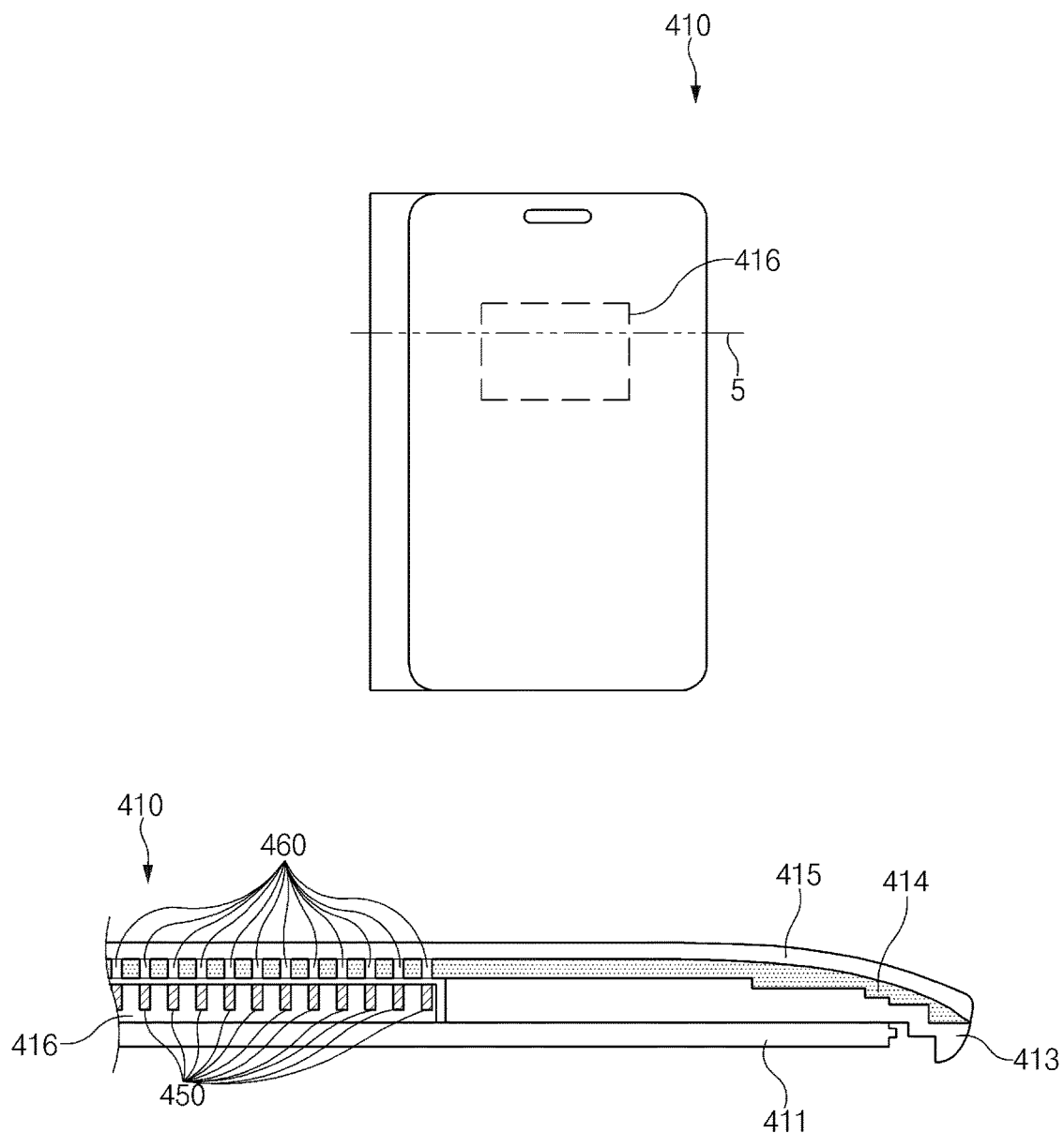
FIG. 4 is another view illustrating a structure of a cover according to an embodiment of the present disclosure.

FIG. 4 is a view illustrating a structure of a cover according to an embodiment of the present disclosure.

FIG. 4 illustrates a portion of a cutaway surface obtained by cutting the light emitting module 416 of the cover 410 (for example, the cover 110 of FIG. 1) along a cutting line 5 that crosses the cover 410. Referring to the cutaway surface of FIG. 4, the cover 410 includes a display 411 (for example, the display 111 of FIG. 1), a metal layer 413 (for example, the metal layer 113 of FIG. 1), a first non-metal layer 414 (for example, the first non-metal layer 114 of FIG. 1), and a second non-metal layer 414 (for example, the second non-metal layer 114 of FIG. 1). The metal layer 413 may include an opening for inserting a light emitting module 416. The light emitting module 416 includes at least one light source 450. The light emitting module 416 may be arranged in the opening included in the metal layer 413, in parallel to the metal layer 413.

The first non-metal layer 414 according to an embodiment of the present disclosure includes at least one opening 460 corresponding to the at least one light source of the light emitting module 416. Light emitted from the at least one light source 450 may pass through the at least one opening 460 formed in the first non-metal layer 414.

The second non-metal layer 415 according to an embodiment of the present disclosure may be arranged on an upper surface of the first non-metal layer 414 to be exposed to the outside. The light emitting from the light emitting module 416 and passing through the at least one opening 460 formed in the first non-metal layer 414 may pass through the second non-metal layer 415 and may be emitted to the outside.

FIG. 5 is a view illustrating an antenna pattern of a cover according to an embodiment of the present disclosure.

Figure 5A:
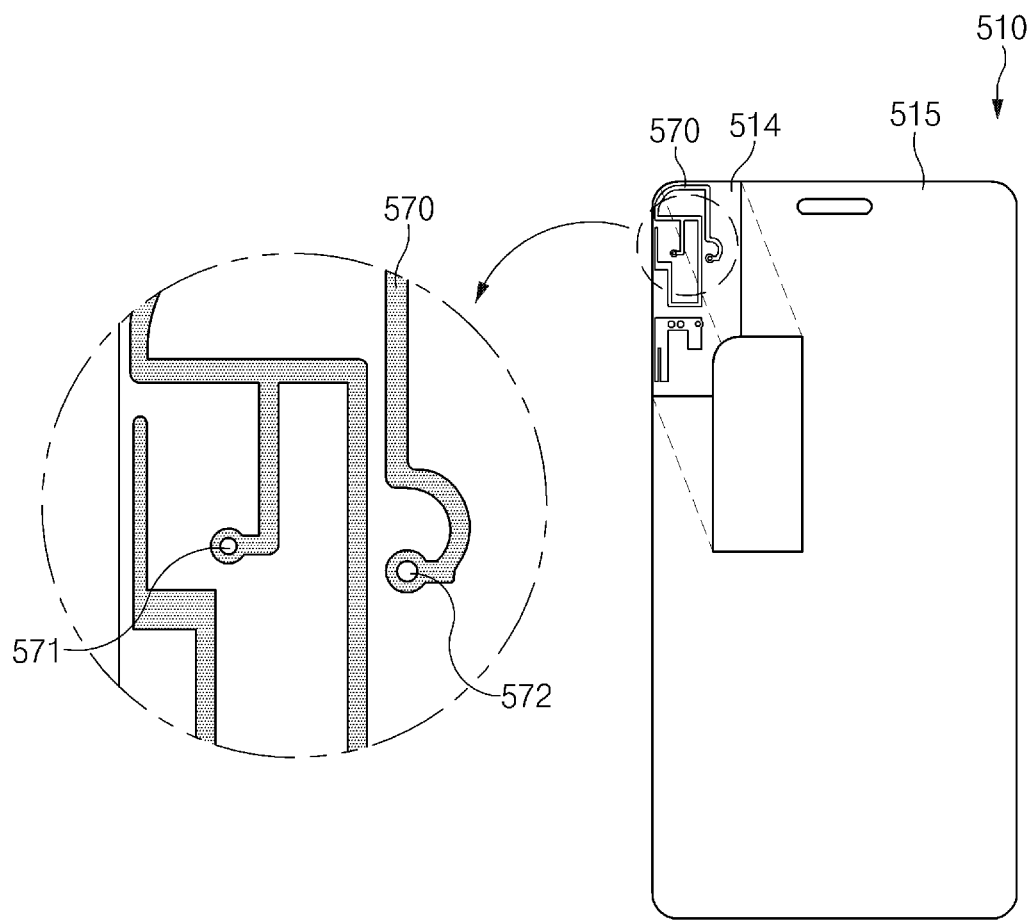
FIGS. 5A and 5B are views illustrating an antenna pattern of a cover according to an embodiment of the present disclosure.

The cover 510 (for example, the cover 110 of FIG. 1) includes an antenna pattern 570 that is formed between a first non-metal layer 514 (for example, the first non-metal layer 114 of FIG. 1) and a second non-metal layer 515 (for example, the second non-metal layer 115 of FIG. 1) to have a specific pattern. The antenna pattern 570, for example, may be formed through a flexible printed circuit (FPC) process, a laser direct structuring (LDS) process, an in-mold antenna (IMA) process, or a direct printed antenna (DPA) process. FIG. 5A illustrates a state in which a portion of the second non-metal layer 515 of the cover 510 is peeled away. Referring to FIG. 5A, the antenna pattern 570 may be situated on the first non-metal layer 514. For example, the antenna pattern 570 may be situated between the first non-metal layer 514 and the second non-metal layer 515. The antenna pattern 570 may be formed in an area corresponding to at least one opening included in the metal layer 513. For example, the antenna pattern 570 may be formed in an area corresponding to an opening (that is, an opening formed to prevent performance of the antenna from deteriorating) formed in an area, which corresponds to the antenna. The antenna pattern 570 may be formed of a conductive material (for example, a metal).

Referring to FIG. 5A, the first non-metal layer 514 includes at least one opening (or a via hole or a hole) 571 and 572 for connecting the antenna pattern 570 to a feeder and the ground. For example, the opening 571 and 572 formed in the first non-metal layer 514 may be filled with a conductive material (for example, a metal), and the conductive material may be electrically connected to the antenna pattern 570.

Figure 5B:
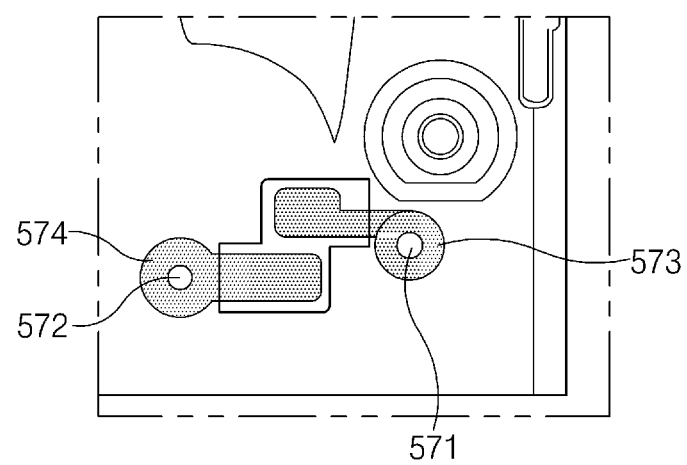

FIG. 5B is a view illustrating a lower portion (that is, a surface opposite to the surface on which the antenna pattern 570 is formed) of the first non-metal layer 514. For example, a lower portion of the first non-metal layer 514 includes a connector 573 and 574 that connects the conductive material filled in the opening 571 and 572 of the first non-metal layer 514 to the feeder or the ground. The connector 573 and 574 may include a C-clip for electrically connecting the antenna. For example, the antenna pattern 570 may pass through the first non-metal layer 514 to be electrically connected to the feeder or the ground.

Although it has been described with reference to FIGS. 1 to 5 that the outer housing 112 is applied to a flip type cover 110 of an electronic device, the outer housing 112 may be applied to the body of an electronic device 100 when the electronic device 100 is of a folding or bar type that does not include the cover 110.

According to an embodiment of the present disclosure, an electronic device comprises an outer housing that surrounds at least a portion of the electronic device, and a display on a front surface which is exposed to the outside through one surface of the outer housing, wherein the outer housing includes a metal layer that is arranged on a rear surface of the display and includes at least one opening, a first non-metal layer that is arranged on an upper surface of the metal layer to overlap the entire metal layer while filling at least a portion of the at least one opening, and a second non-metal layer that is arranged on an upper surface of the first non-metal layer to be exposed to the outside.

According to an embodiment of the present disclosure, the outer housing further comprises a bonding layer that is arranged between the first non-metal layer and the second non-metal layer to bond the first non-metal layer and the second non-metal layer.

According to an embodiment of the present disclosure, the first non-metal layer and the second non-metal layer are formed of different materials.

According to an embodiment of the present disclosure, the first non-metal layer comprises a polymer.

According to an embodiment of the present disclosure, the second non-metal layer comprises leather or cloth.

According to an embodiment of the present disclosure, the electronic device further comprises an antenna, and the at least one opening may be formed to correspond to a location of the antenna.

According to an embodiment of the present disclosure, the outer housing further comprises an antenna pattern having a specific pattern in an area corresponding to the at least one opening between the first non-metal layer and the second non-metal layer, and the antenna pattern passes through the first non-metal layer to be electrically connected to a feeder or a ground arranged within the outer housing.

According to an embodiment of the present disclosure, the electronic device further comprises a light emitting module that comprises at least one light source arranged in one of the at least one opening included in the metal layer, and the one of the at least one opening may comprise at least one opening corresponding to the at least one light source.

According to an embodiment of the present disclosure, an electronic device comprises an outer housing that comprises a first surface facing a first direction and a second surface facing a second direction opposite to the first direction, and a display that is exposed through a first surface of the outer housing. The outer housing comprises a plate that forms at least a portion of the second surface, and the plate comprises a metallic substrate that comprises at least one opening, a first non-metal layer that overlaps at least a portion of the metallic substrate when viewed from the top of the plate and is exposed to the second surface, a second non-metal layer that comprises a first portion that fills at least a portion of the at least one opening and is arranged between the first non-metal layer and the second surface and a second portion that is arranged between the first non-metal layer and the metallic substrate while substantially overlapping the entire metal substrate when viewed from the top of the plate and a bonding layer that is arranged between the first non-metal layer and the second non-metal layer.

According to an embodiment of the present disclosure, the outer housing further comprises an antenna radiator, and the at least one opening is arranged adjacent to the antenna radiator.

According to an embodiment of the present disclosure, a flatness of a surface between the second non-metal layer and the bonding layer is uniform over the surface.

Figure 6:
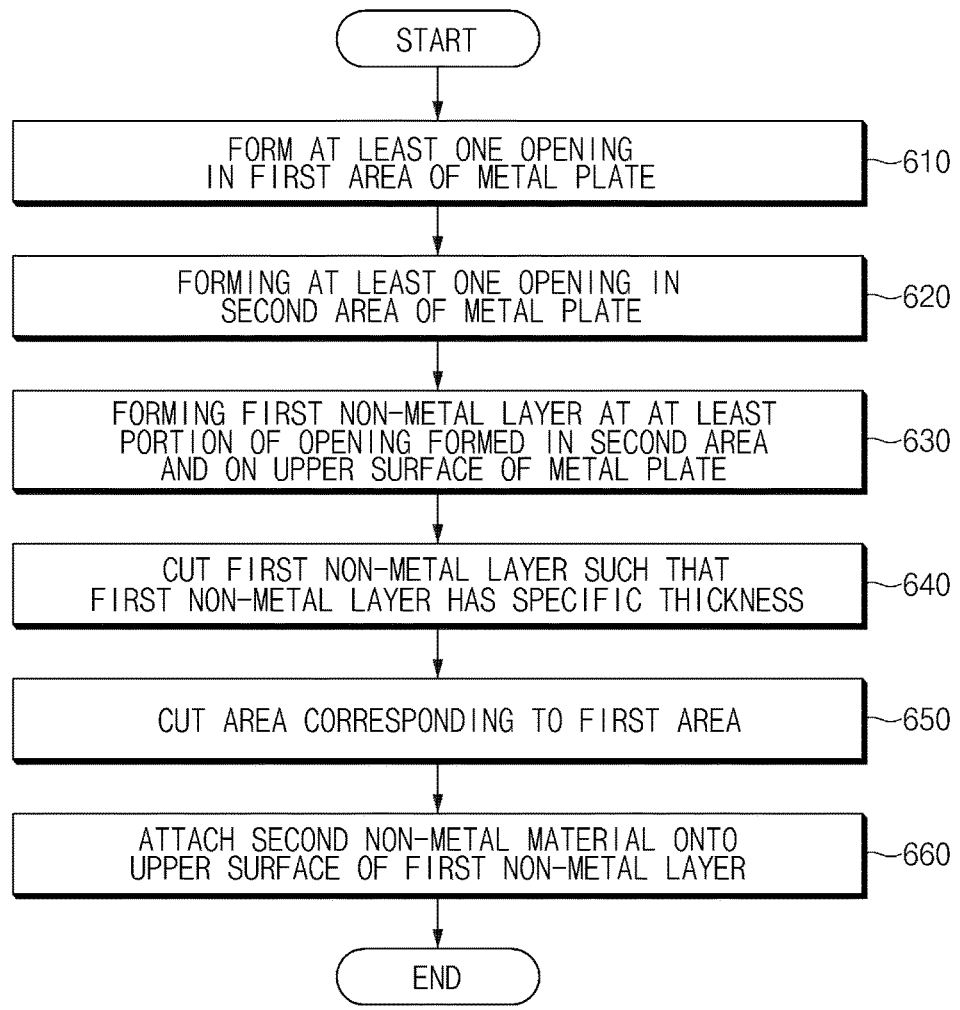
FIG. 6 is a flowchart of a method of manufacturing an outer housing according to an embodiment of the present disclosure.

FIG. 6 is a flowchart illustrating a method for manufacturing an outer housing according to an embodiment of the present disclosure.

Referring to FIG. 6, according to an embodiment of the present disclosure, in step 610, at least one opening is formed in a first area of a metal plate. The first area, for example, may be an area that is necessary for a manufacturing process of an outer housing but is subsequently excluded from the outer housing. The first area of the metal plate may be a peripheral area of the metal plate. An opening formed in the first area of the metal plate may be used to secure the metal plate in a process of manufacturing an outer housing.

According to an embodiment of the present disclosure, in step 620, at least one opening is formed in a second area of the metal plate. The second area of the metal plate may be a central area of the metal plate. For example, the second area may be the remaining area other than the first area.

An opening formed in the second area may be an area corresponding to an antenna included in the body of the electronic device 100. The opening formed in the second area may be an area that at least partially corresponds to an antenna (or an antenna radiator) included in the outer housing. The opening formed in the second area may be an area corresponding to a speaker included in the outer housing. When a light emitting module is inserted into the outer housing, an opening for inserting a light emitting module into the second area may be additionally formed. The light emitting module may be arranged in the at least one opening included in the metal plate, in parallel to the metal layer.

According to an embodiment of the present disclosure, in step 630, a first non-metal layer that fills at least a portion of the opening formed in the second area may be formed by injection-molding a first non-metal material of a specific thickness on an upper surface of the metal plate. The first non-metal layer may be formed on the upper surface of the metal plate to overlap the entire second area of the metal plate while filling at least a portion of the at least one opening formed in the metal plate. For example, the first non-metal layer may be formed such that the second area of the metal plate is not viewed from the upper surface of the first non-metal layer after the first non-metal layer is formed.

According to an embodiment of the present disclosure, when a light emitting module is inserted into the opening included in the metal plate, at least one opening corresponding to at least one light source of the light emitting module may be formed in the first non-metal layer. For example, the first non-metal layer may include openings, the number of which corresponds to the number of light sources included in the light emitting module. Light emitted by the at least one light source of the light emitting module may pass through the at least one opening formed in the first non-metal layer.

According to an embodiment of the present disclosure, the first non-metal layer 20 may be formed of a polymeric material (or a resin). For example, the first non-metal layer 20 may include a polymeric material such as PC or PBT. The first non-metal layer 20 may further include a glass fiber in addition to a polymer.

According to an embodiment of the present disclosure, the opening formed in the first area may be used to secure the metal plate in a process of injection-molding a first non-metal material.

According to an embodiment of the present disclosure, in step 640, the first non-metal layer is cut to a specific thickness. A periphery of the first non-metal layer may be cut to have a curved form. That is, the first non-metal layer may be cut such that a central portion of the first non-metal layer has a maximum thickness and the thickness of the first non-metal layer decreases as it goes towards the periphery of the first non-metal layer. The first non-metal layer may be cut such that the maximum thickness of the first non-metal layer is a specific thickness (for example, 0.1 mm) or less. For example, the first non-metal layer may be cut such that the thickness of the first non-metal layer tapers down to 0 on the outermost side. The first non-metal layer may be cut such that the first non-metal layer overlaps the entire second area of the metal plate (that is, the metal plate is not exposed to the outside) even after the first non-metal layer is cut.

According to an embodiment of the present disclosure, in step 650, an area of the first non-metal layer corresponding to the first area is cut. If the area corresponding to the first area is cut, a portion corresponding to the second area 702 may be left.

According to an embodiment of the present disclosure, in step 660, a second non-metal layer is formed by attaching a second non-metal material onto an upper surface of the first non-metal layer. The second non-metal layer may be formed of leather or cloth.

According to an embodiment of the present disclosure, a process of forming at least one opening in the first non-metal layer such that the at least one opening corresponds to at least one light source included in the light emitting module may further be provided after step 640 or step 650.

FIGS. 7A to 7E are views illustrating a method for manufacturing an outer housing according to an embodiment of the present disclosure.

Figure 7:
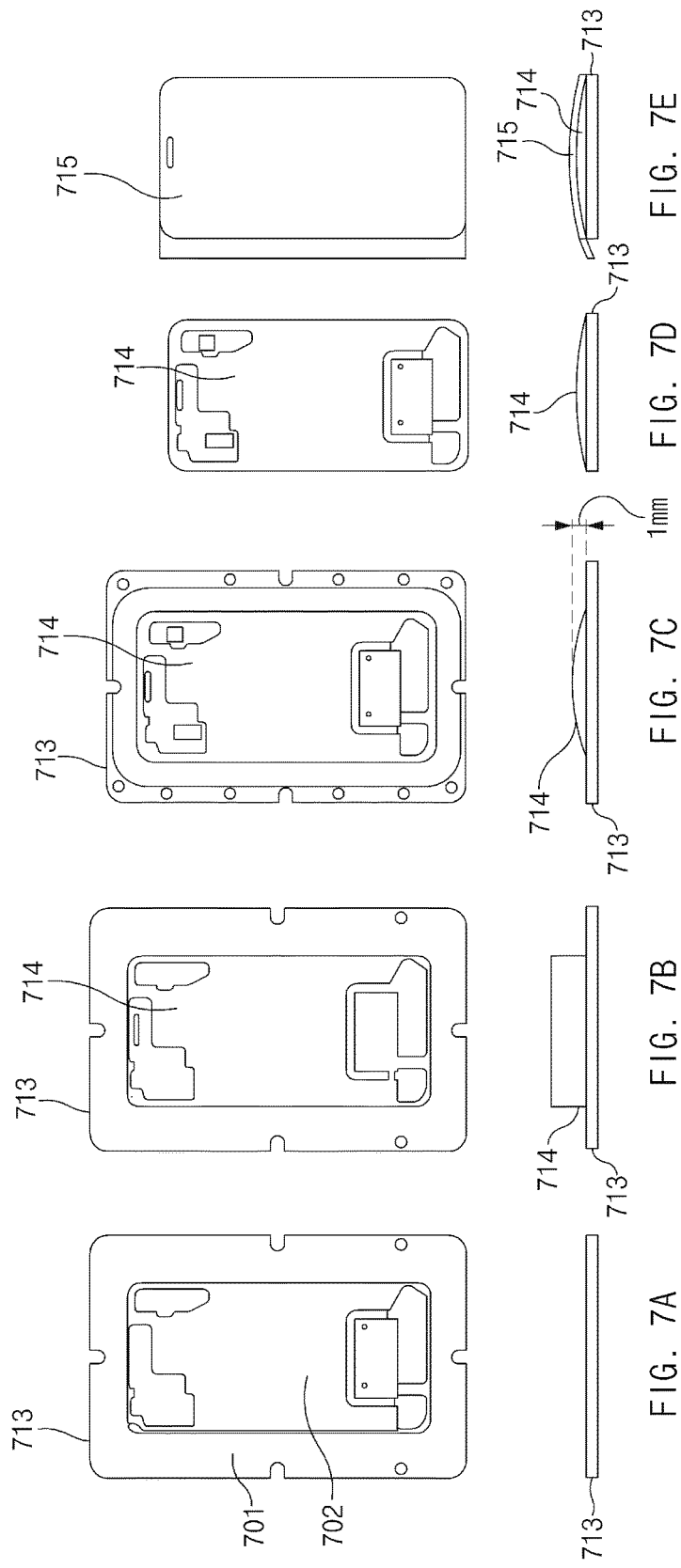
FIGS. 7A to 7E are views illustrating a method of manufacturing an outer housing according to an embodiment of the present disclosure.

Referring to FIG. 7A, at least one opening may be formed in a first area 701 and/or a second area 702 of a metal plate 713 (for example, the metal layer 113 of FIG. 1). The first area 701, for example, may be an area that is necessary for a manufacturing process of an outer housing but is subsequently excluded from the outer housing. The first area 701 of the metal plate 713 may be a peripheral area of the metal plate 713. For example, the opening formed in the first area 701 of the metal plate 713 may be used to secure the metal plate 713 in a process of manufacturing the outer housing.

According to an embodiment of the present disclosure, the second area 702 of the metal plate 713 may be a central area of the metal plate 713. For example, the second area 702 may be the remaining area other than the first area 701. The second area 702, for example, may be an area that is included in the final product, unlike the first area 701 for securing the metal plate 713 in the process of manufacturing the outer housing. An opening formed in the second area 702 may be an area corresponding to an antenna included in the body of the electronic device. The opening formed in the second area 702 may be an area that corresponds to an antenna (or an antenna radiator) included in the outer housing. The opening formed in the second area 702 may be an area corresponding to a speaker included in the outer housing. When a light emitting module is inserted into the outer housing, an opening for inserting a light emitting module into the second area 702 may be additionally formed. The light emitting module may be arranged in the at least one opening included in the metal plate 713.

Referring to FIG. 7B, a first non-metal layer 714 that fills at least a portion of the opening formed in the second area 702 by injection-molding a first non-metal material of a specific thickness on an upper surface of the metal plate 713. The first non-metal layer 714 may be formed on the upper surface of the metal plate 713 to overlap the entire second area 702 of the metal plate 713 while filling at least a portion of the at least one opening formed in the metal plate 713. For example, the first non-metal layer 714 may be formed such that the second area 702 of the metal plate 713 is not visible from the upper surface of the first non-metal layer 714 after the first non-metal layer 714 is formed.

According to an embodiment of the present disclosure, when a light emitting module is inserted into the opening included in the metal plate 713, at least one opening corresponding to at least one light source of the light emitting module may be formed in the first non-metal layer 714. For example, the first non-metal layer 714 may include openings, the number of which corresponds to the number of light sources included in the light emitting module. Light emitted by the at least one light source of the light emitting module may pass through the at least one opening formed in the first non-metal layer 714.

Referring to FIG. 7C, the first non-metal layer 714 may be cut to have a specific thickness. A periphery of the first non-metal layer 714 may be cut to have a curved form. That is, the first non-metal layer 714 may be cut such that a central portion of the first non-metal layer 714 has a maximum thickness and the thickness of the first non-metal layer 714 decreases as it goes towards the periphery of the first non-metal layer 714. The first non-metal layer 714 may be cut such that the maximum thickness of the first non-metal layer 714 is a specific thickness (for example, 0.1 mm). For example, the first non-metal layer 714 may be cut such that the thickness of the first non-metal layer 714 tapers down to 0 on the outermost side. The first non-metal layer 714 may be cut such that the first non-metal layer 714 overlaps the entire second area 702 of the metal plate 713 (that is, the metal plate is not exposed to the outside) even after the first non-metal layer 714 is cut.

Referring to FIG. 7D, an area corresponding to the first area 701 may be cut. If the area corresponding to the first area 701 is cut, a portion corresponding to the second area 702 may be left.

Referring to FIG. 7E, the second non-metal layer 715 may be formed by attaching the second non-metal material onto the upper surface of the first non-metal layer 714. The second non-metal layer may be formed of leather or cloth.

According to an embodiment of the present disclosure, a method of manufacturing an outer housing comprises forming at least one opening in a first area of a metal plate, forming at least one opening in a second area of the metal plate, forming a first non-metal layer at least a portion of the at least one opening formed in the second area and on an upper surface of the metal plate such that the first non-metal layer overlaps the entire second area of the metal plate, cutting the first non-metal layer such that the first non-metal layer has a specific thickness, cutting an area corresponding to the first area and attaching a second non-metal material on an upper surface of the first non-metal layer.

According to an embodiment of the present disclosure, the attaching of the second non-metal material comprises attaching the second non-metal material that is different from the first non-metal material onto an upper surface of the first non-metal layer.

According to an embodiment of the present disclosure, the forming of the first non-metal layer comprises forming a polymer material at the at least a portion of the at least one opening formed in the second area and on the upper surface of the metal plate.

According to an embodiment of the present disclosure, the attaching of the second non-metal material comprises attaching leather or cloth onto the upper surface of the first non-metal layer.

According to an embodiment of the present disclosure, the cutting of the first non-metal layer comprises cutting a periphery of the first non-metal layer such that the periphery of the first non-metal layer has a curved form.

According to an embodiment of the present disclosure, the first area may be a peripheral area of the metal plate and the second area may be the remaining area other than the first area.

Figure 8:
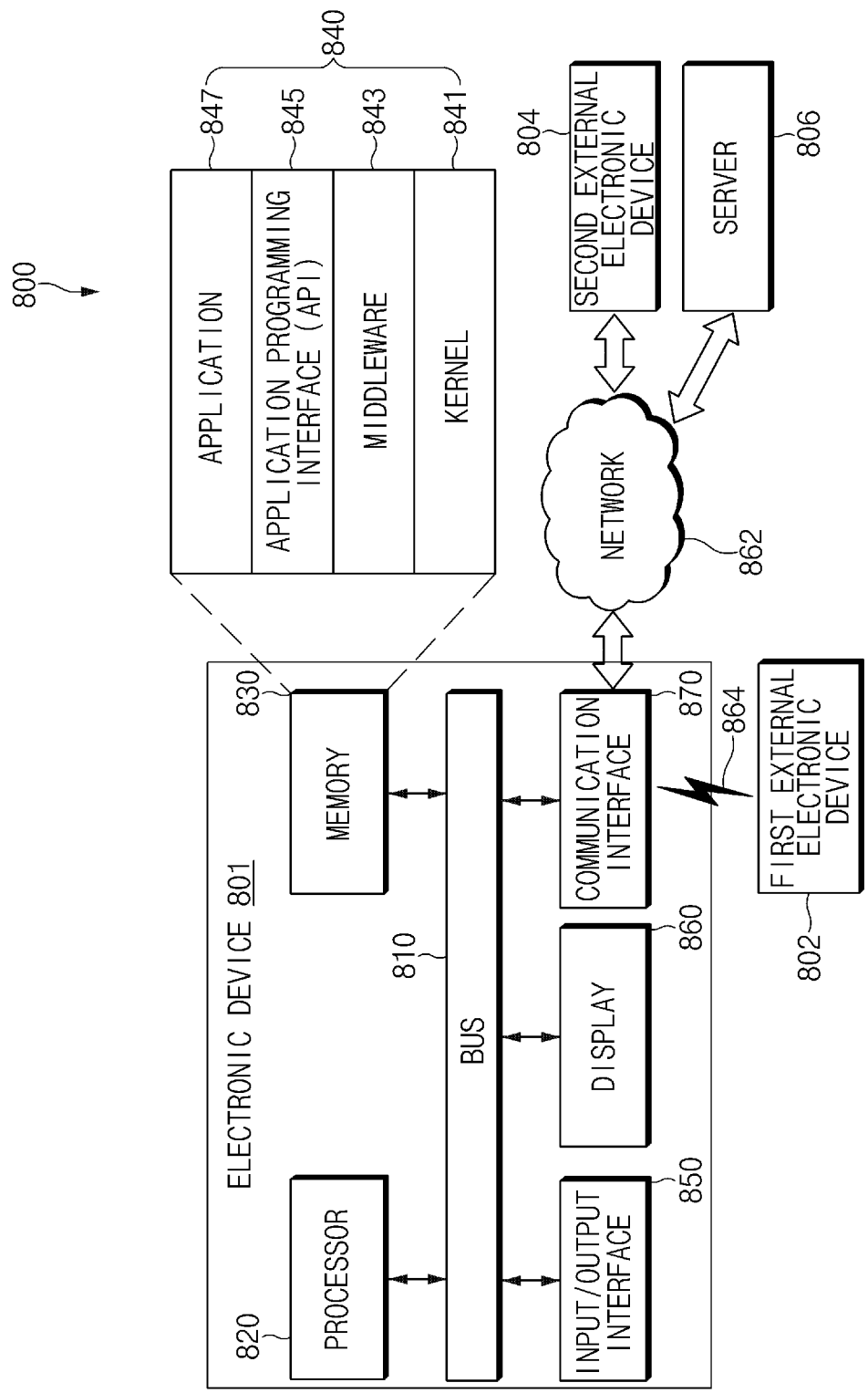
FIG. 8 is a view illustrating an electronic device in a network environment according to an embodiment of the present disclosure.

FIG. 8 illustrates an electronic device in a network environment according to an embodiment of the present disclosure.

An electronic device 801 in a network environment 800 will be described with reference to FIG. 8. The electronic device 801 includes a bus 810, a processor 820, a memory 830, an input/output interface 850, a display 860, and a communication interface 870. In an embodiment of the present disclosure, at least one of the foregoing elements may be omitted or another element may be added to the electronic device 801.

The bus 810 may include a circuit for connecting the above-mentioned elements 810 to 870 to each other and transferring communications (e.g., control messages and/or data) among the above-mentioned elements.

The processor 820 may include at least one of a central processing unit (CPU), an application processor (AP), or a communication processor (CP). The processor 820 may perform data processing or an operation related to communication and/or control of at least one of the other elements of the electronic device 801.

The memory 830 may include a volatile memory and/or a nonvolatile memory. The memory 830 may store instructions or data related to at least one of the other elements of the electronic device 801. According to an embodiment of the present disclosure, the memory 830 store software and/or a program 840. The program 840 includes, for example, a kernel 841, a middleware 843, an application programming interface (API) 845, and/or an application program (or an application) 847. At least a portion of the kernel 841, the middleware 843, or the API 845 may be referred to as an operating system (OS).

The kernel 841 may control or manage system resources (e.g., the bus 810, the processor 820, the memory 830, and the like) used to perform operations or functions of other programs (e.g., the middleware 843, the API 845, or the application program 847). Furthermore, the kernel 841 may provide an interface for allowing the middleware 843, the API 845, or the application program 847 to access individual elements of the electronic device 801 in order to control or manage the system resources.

The middleware 843 may serve as an intermediary so that the API 845 or the application program 847 communicates and exchanges data with the kernel 841.

Furthermore, the middleware 843 may handle one or more task requests received from the application program 847 according to a priority order. For example, the middleware 843 may assign at least one application program 847 a priority for using the system resources (e.g., the bus 810, the processor 820, the memory 830, and the like) of the electronic device 801. For example, the middleware 843 may handle the one or more task requests according to the priority assigned to the at least one application, thereby performing scheduling or load balancing with respect to the one or more task requests.

The API 845, which is an interface for allowing the application 847 to control a function provided by the kernel 841 or the middleware 843, may include, for example, at least one interface or function (e.g., instructions) for file control, window control, image processing, character control, and the like.

The input/output interface 850 may serve to transfer an instruction or data input from a user or another external device to other elements of the electronic device 801. Furthermore, the input/output interface 850 may output instructions or data received from other elements of the electronic device 801 to the user or another external device.

The display 860 may include, for example, a liquid crystal display (LCD), a light-emitting diode (LED) display, an organic light-emitting diode (OLED) display, a microelectromechanical systems (MEMS) display, or an electronic paper display. The display 860 may present various content (e.g., a text, an image, a video, an icon, a symbol, and the like) to the user. The display 860 may include a touch screen, and may receive a touch, gesture, proximity or hovering input from an electronic pen or a part of a body of the user.

The communication interface 870 may set communications between the electronic device 801 and a first external electronic device 802, a second external electronic device 804, or a server 806. For example, the communication interface 870 may be connected to a network 862 via wireless communications or wired communications so as to communicate with the second external electronic device 804 or the server 806.

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 864. The short-range communications may include at least one of wireless fidelity (Wi-Fi), Bluetooth, Bluetooth low energy (BLE), Zigbee, near field communication (NFC), magnetic secure transmission (MST), or global navigation satellite system (GNSS). The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used.

The wired communications may include at least one of universal serial bus (USB), high definition multimedia interface (HDMI), recommended standard 232 (RS-232), plain old telephone service (POTS), and the like. The network 862 may include at least one of telecommunications networks, for example, a computer network (e.g., local area network (LAN) or wide area network (WAN)), the Internet, or a telephone network. The types of the first external electronic device 802 and the second external electronic device 804 may be the same as or different from the type of the electronic device 801. According to an embodiment of the present disclosure, the server 806 may include a group of one or more servers. A portion or all of operations performed in the electronic device 801 may be performed in the first electronic device 802, the second external electronic device 804, or the server 806. When the electronic device 801 performs a certain function or service automatically or in response to a request, the electronic device 801 may request at least a portion of functions related to the function or service from the first electronic device 802, the second external electronic device 804, or the server 806 instead of or in addition to performing the function or service for itself. The first electronic device 802, the second external electronic device 804, or the server 806 may perform the requested function or additional function, and may transfer a result of the performance to the electronic device 801. The electronic device 801 may use a received result itself or additionally process the received result to provide the requested function or service. To this end, for example, a cloud computing technology, a distributed computing technology, or a client-server computing technology may be used.

A module or a program module according to an embodiment of the present disclosure may include at least one of the above-mentioned elements, or some elements may be omitted or other additional elements may be added. Operations performed by the module, the program module or other elements according to an embodiment of the present disclosure may be performed in a sequential, parallel, iterative or heuristic way. Furthermore, some operations may be performed in another order or may be omitted, or other operations may be added.

According to an embodiment of the present disclosure, strength may be secured while an influence on an antenna is minimized, and a material, such as leather or cloth, which cannot be easily attached to a metal may be employed in an external appearance of an electronic device. Further, the performance of the antenna formed in the outer housing may be improved.

While the present disclosure has been shown and described with reference to an embodiment thereof, it will be understood by those skilled in the art that various changes in form and details may be made therein without departing from the spirit and scope of the present disclosure as defined by the appended claims and their equivalents.

What is claimed is:

1. An electronic device comprising:
   an outer housing that surrounds at least a portion of the electronic device; and
   a display, a front surface of which is exposed to the outside through one surface of the outer housing,
   wherein the outer housing comprises:
   a metal layer arranged on a rear surface of the display and comprises at least one opening;
   a first non-metal layer arranged on an upper surface of the metal layer to overlap the entire metal layer while filling at least a portion of the at least one opening; and
   a second non-metal layer arranged on an upper surface of the first non-metal layer to be exposed to the outside.

2. The electronic device of claim 1, wherein the outer housing further comprises a bonding layer arranged between the first non-metal layer and the second non-metal layer to bond the first non-metal layer to the second non-metal layer.

3. The electronic device of claim 1, wherein the first non-metal layer and the second non-metal layer are formed of different materials.

4. The electronic device of claim 1, wherein the first non-metal layer comprises a polymer.

5. The electronic device of claim 1, wherein the second non-metal layer comprises at least one of leather and cloth.

6. The electronic device of claim 1, further comprising:
   an antenna, wherein the at least one opening is formed to correspond to a location of the antenna.

7. The electronic device of claim 1, wherein the outer housing further comprises an antenna pattern having a specific pattern in an area corresponding to the at least one opening between the first non-metal layer and the second non-metal layer, and the specific antenna pattern passes through the first non-metal layer to be electrically connected to a feeder or a ground arranged within the outer housing.

8. The electronic device of claim 1, further comprising:
   a light emitting module comprising at least one light source arranged in one of the at least one opening included in the metal layer,
   wherein the one of the at least one opening comprises at least one opening corresponding to the at least one light source.

9. A method of manufacturing an outer housing, the method comprising:
   forming at least one opening in a first area of a metal plate;

forming at least one opening in a second area of the metal plate;

forming a first non-metal layer at at least a portion of the at least one opening formed in the second area and on an upper surface of the metal plate such that the first non-metal layer overlaps the entire second area of the metal plate;

cutting the first non-metal layer;

cutting an area corresponding to the first area; and attaching a second non-metal material on an upper surface of the first non-metal layer.

10. The method of claim 9, wherein attaching the second non-metal material comprises attaching the second non-metal material that is different from the first non-metal material, onto an upper surface of the first non-metal layer.

11. The method of claim 9, wherein forming the first non-metal layer comprises forming a polymer material at the at least a portion of the at least one opening formed in the second area and on the upper surface of the metal plate.

12. The method of claim 9, wherein attaching the second non-metal material comprises
attaching leather or cloth onto the upper surface of the first non-metal layer.

13. The method of claim 9, wherein cutting the first non-metal layer comprises
cutting a periphery of the first non-metal layer such that the periphery of the first non-metal layer has a curved form.

14. The method of claim 9, wherein the first area is a peripheral area of the metal plate and the second area is the remaining area.

15. An electronic device comprising:
an outer housing comprising a first surface facing a first direction and a second surface facing a second direction opposite to the first direction; and
a display exposed through a first surface of the outer housing,
wherein the outer housing comprises a plate that forms at least a portion of the second surface, and
wherein the plate comprises:
a metallic substrate comprising at least one opening;
a first non-metal layer that overlaps at least a portion of the metallic substrate when viewed from the top of the plate and is exposed to the second surface;
a second non-metal layer comprising a first portion that fills at least a portion of the at least one opening and is arranged between the first non-metal layer and the second surface and a second portion that is arranged between the first non-metal layer and the metallic substrate while substantially overlapping the entire metal substrate when viewed from the top of the plate; and
a bonding layer arranged between the first non-metal layer and the second non-metal layer.

16. The electronic device of claim 15, wherein the first non-metal layer and the second non-metal layer are formed of different materials.

17. The electronic device of claim 15, wherein the first non-metal layer comprises a polymer.

18. The electronic device of claim 15, wherein the second non-metal layer comprises at least one of leather and cloth.

19. The electronic device of claim 15, wherein the outer housing further comprises an antenna radiator, and the at least one opening is arranged adjacent to the antenna radiator.

20. The electronic device of claim 15, wherein a flatness of a surface between the second non-metal layer and the bonding layer is uniform over the surface.

* * * * *